350-6.5 SR OR 3,277,772

Oct. 11, 1966 J. G. ATWOOD 3,277,772

OPTICAL SCANNING SYSTEM

Filed Jan. 30, 1956 3 Sheets-Sheet 1

INVENTOR.
JOHN G. ATWOOD
BY John W. McLaren
ATTORNEY

Oct. 11, 1966 J. G. ATWOOD 3,277,772

OPTICAL SCANNING SYSTEM

Filed Jan. 30, 1956 3 Sheets-Sheet 2

INVENTOR.
JOHN G. ATWOOD
BY John W. McLaren
ATTORNEY

Oct. 11, 1966 J. G. ATWOOD 3,277,772

OPTICAL SCANNING SYSTEM

Filed Jan. 30, 1956 3 Sheets-Sheet 3

INVENTOR.
JOHN G. ATWOOD
BY John W. McLaren
ATTORNEY

United States Patent Office 3,277,772
Patented Oct. 11, 1966

3,277,772

OPTICAL SCANNING SYSTEM

John G. Atwood, Redding, Conn., assignor to The Perkin-Elmer Corporation, Norwalk, Conn., a corporation of New York Filed Jan. 30, 1956, Ser. No. 562,165
11 Claims. (Cl. 88—1)

This invention is concerned with a system for scanning information in the form of radiant energy contained in a selected field of view. More particularly, the present invention is especially suited for use in connection with passive radiation detection systems where an extremely low level of radiation signal is received.

In some nonpassive systems which both transmit and receive energy, such as radar systems, the radiation energy received is a portion of the same radiation which was initially transmitted by the system, and consequently there exists the possibility of meeting the problem of weak signals by increasing the energy level of the transmitted power or by correlating the received energy with known characteristics of the transmitted energy so that noise and random signal sources may be discriminated against, while the intelligence contained in the received signal may be segregated and more readily discerned.

In a passive radiation detection system, however, there is no direct control over the amount of energy received and, accordingly, it is almost invariably at an extremely low level. Moreover, in a passive system, it is more difficult to segregate interference and noise signals from the intelligence contained in the received signal since there is no transmitted energy with which the received signal can be correlated to make use of known and predetermined characteristics of the transmitted signal. The prime requisites of a passive radiation detection system therefore demand that its components be used at maximum efficiency to completely coordinate all received information as fully as possible so as to produce best results.

The present invention is concerned with an optical system which scans and dissects a radiant field of view so as to avail of the maximum amount of received energy and transmit the radiant energy signals to a detection means with minimum loss of energy to make the fullest use of the capabilities of the detection means.

The present system is particularly suited to use with a passive radiation detection system of the infrared type, for instance, and for purposes of convenience such a system will be used to illustrate and describe the operation, features, and advantages of the invention. The invention is not, however, limited to use with an infrared system and may find applicability in any type of radiant energy detection system which requires an optical arrangement yielding maximum efficiency from a low level received signal. The present system is especially useful where it may be anticipated that in addition to a low energy received signal, a relatively high noise level may be present in the received signals, the system, and the radiation detection means itself.

Figure 1:
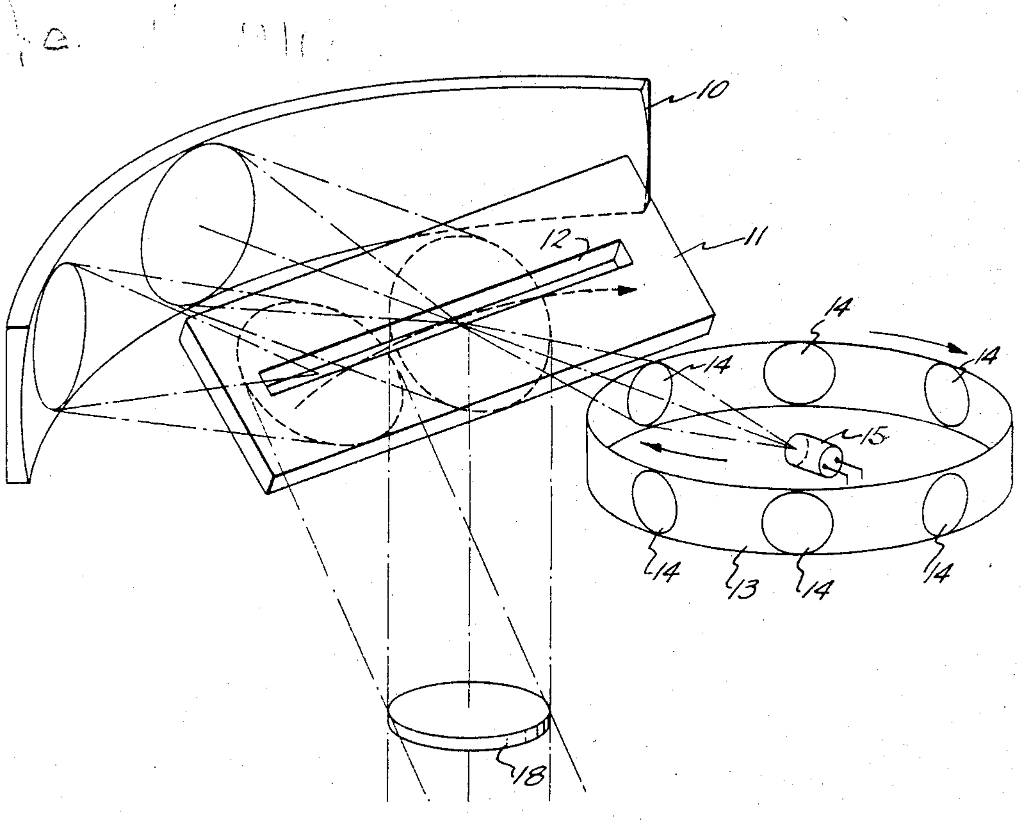
Figure 2:
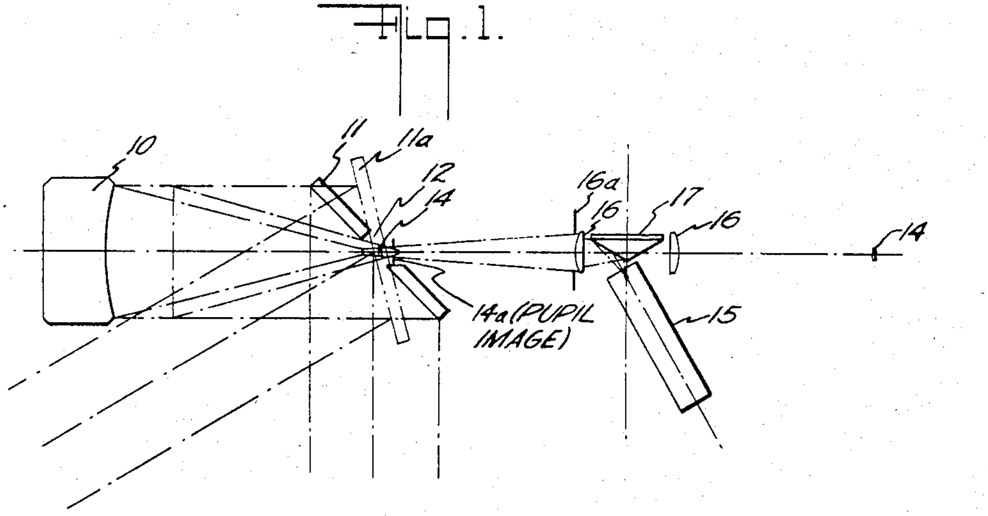
Figure 3:
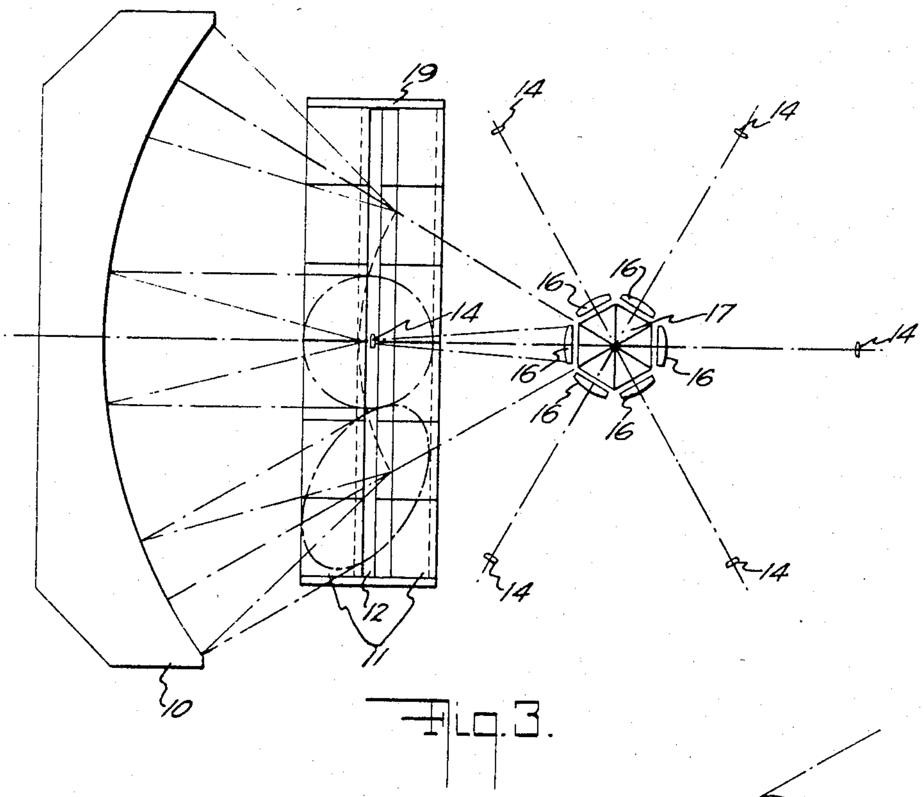
Figure 4:
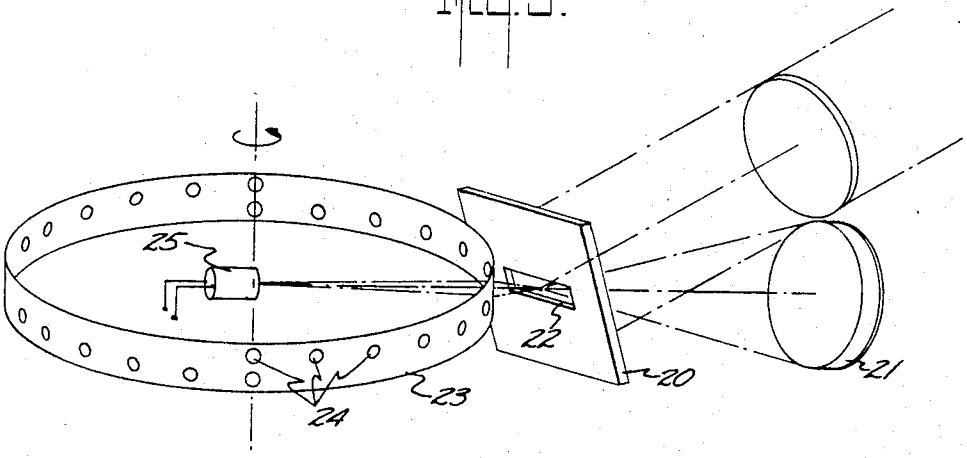
Figure 4A:
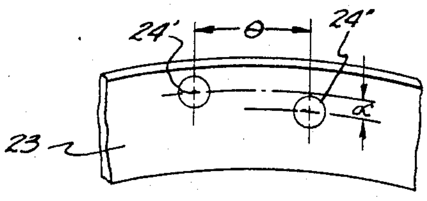
Figure 5:
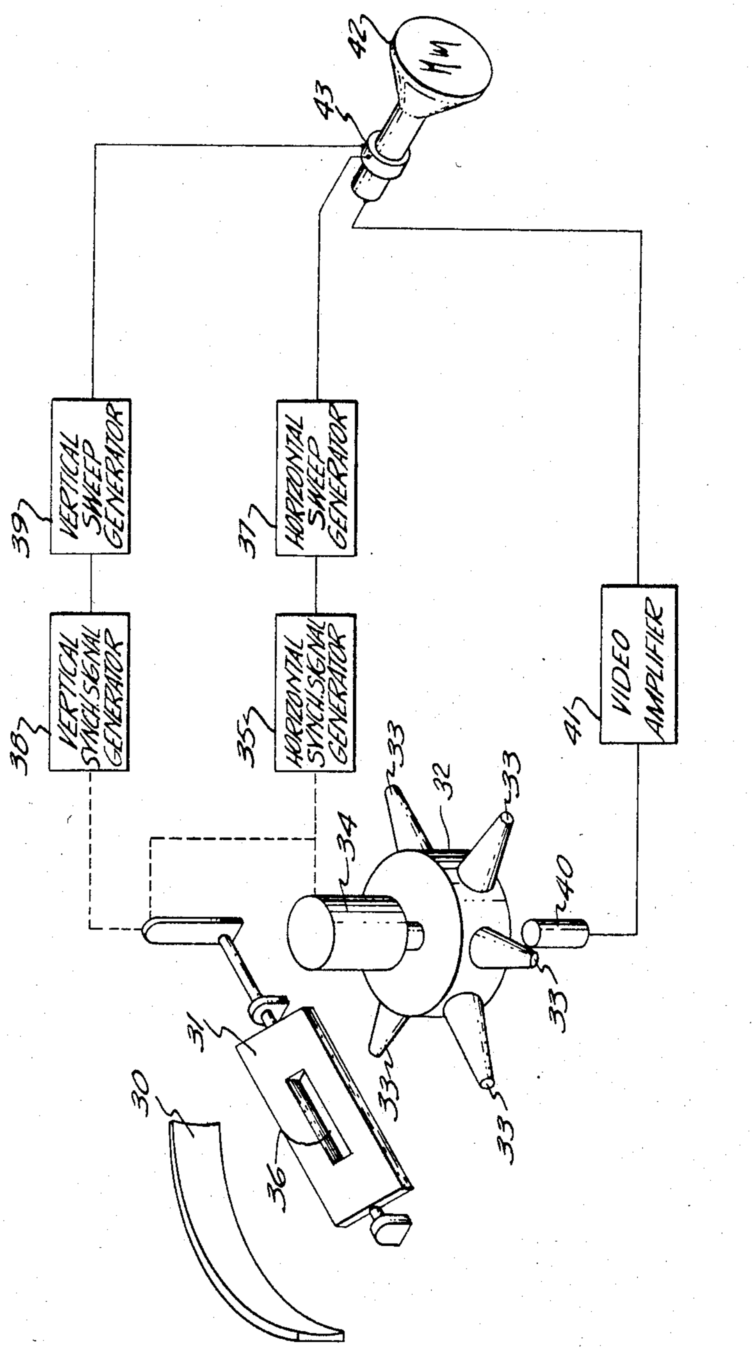

The present system will be better understood by the following description of several embodiments and their operation when taken together with the accompanying drawings in which, FIG. 1 is an isometric schematic illustration of an embodiment of the present invention, FIG. 2 is a cross-sectional view of an embodiment of the present invention, FIG. 3 is a top view of the optical system of FIG. 2, FIG. 4 is an isometric schematic illustration of another embodiment of the invention, FIG. 4*a* is a detailed view of the disposition of the scanning lenses employed in the embodiment of FIG. 4, and FIG. 5 is a schematic diagram of a radiation detection system embodying the present invention and arranged to display the intelligence contained in the radiant energy on a cathode ray tube.

The problem of dissecting radiant energy information contained in a selected field of view may be approached in a number of different ways. Several fundamental methods of dissecting such a field of view may fall into one of the following categories:

One type of system may be arranged so that its aperture may be pointed along a repetitive line of scan. This, of course, would necessitate that the entire apparatus be moved to observe successive spots in the field along a scan line and the system could be appropriately pointed so that the scan lines will be synchronously swept to include the entire field of view.

Another method of scanning would be to form a stationary image of the field of view with an optical system and then to dissect the image with either a moving spot or a moving mirror system.

Yet another possible method would be to point the aperture of the system by means of moving mirrors appropriately positioned in front of the aperture. Where a field of view must be rapidly scanned to utilize the capabilities of a rapidly responsive detection means, the method of pointing the entire apparatus is likely to be impractical, especially if sequential line scanning is used. Such a system would require oscillation of the the entire apparatus at a frequency which would give rise to very serious problems of driving, vibration, and control. It would similarly be difficult to employ rotating mirrors for optically pointing the aperture of a stationary condensing system across the field of view at a high repetitive rate. For instance, a rotating polygon with flat mirror faces, if equal in width to the diameter of the aperture and, if subtending an angle of 30° at the center of the polygon, might be provided with twelve such facets in a typical system. Such a rotating optical element would produce twelve 60° scans per revolution, and therefore would be required to rotate at about 14 revolutions per second or 840 r.p.m. to take full advantage of the fastest response time of an infrared detector of the lead telluride type, for example. The acceleration at the periphery of such a rotating polygon would therefore be about 92,000 cm. per sec./$^2$ or about 95 *g*'s. The rotating polygon, of course, would produce a scan in one direction only. The line scan thus produced would have to be swept across the entire field of view, and this might be achieved either by physical motion of the entire scanning head about another axis or by forming a line image perpendicular to the direction of scan by a subsequent optical system and then dissecting that image in a line scan direction.

The use of rotating polygonal mirrors as a dissecting means at the aperture of a system presents a particular problem when used to transmit infrared energy. It is not unusual in such systems that a transmitting window be placed between the actual apparatus and the outside atmosphere. Because of the expense and fragility of many of the window materials suitable for transmitting infrared energy without excessive loss, it is desirable to design a system to operate with as small a window as possible. Consequently, in any scheme where the aperture is pointed to make the scan, the aperture should be as close to the infrared transmitting window as possible. In an ideal design, the aperture would be defined by the window. In contrast to this, however, the size and angular speed of the rotating polygons require that each facet of the polygon define the aperture of the system while it is in use. Thus, the polygon should be of minimum size. These two requirements cannot be completely reconciled, and therefore each must be compromised to produce an operative system.

An alternative method of providing rapid line scan is to use a fixed optical system which has as its window the aperture of the system. Such an optical system forms a fixed image which is then dissected by a moving pin hole or a moving mirror system. However, if it is desired to scan very wide fields of view, it is very difficult to use a mirror system to form an image of the field which may be of the order of 60° x 60°, for instance, because the focal ratio of the system would have to be made extremely small in order that the field not be larger than the aperture. Thus, a system using mirrors to form a fixed image has very definite disadvantages and practical difficulties.

A system using a lens to form a fixed image might be designed in a symmetrical monocentric form, but the disadvantages of this type of system are principally two-fold. Firstly, the large size aperture required would necessitate the use of extremely large energy transmitting optical elements. Secondly, in order to produce good definition of a 60° field of view, the focal ratio of the lens system would necessarily be quite large. This in turn would mean that the image would be very large, and accordingly would be very difficult to dissect by any moving system.

The present invention solves the problem and minimizes the shortcomings of prior art schemes previously mentioned by using a fixed mirror system to form an image of the field of view with expansion in one direction only. That is to say, in a typical embodiment, the image may be formed of a field of the order of 60° x 1°. Thus, in accordance with the teaching of the present invention, the optical system uses its radiation transmitting window (which may take the form of a Schmidt plate) as its aperture, and it has a small focal ratio of the order of $f$:3 with good definition over the 60° field. If, in a typical system therefore, an aperture of 60 mm. is used, the $f$:3 focal length would be 180 mm. Moreover, in accordance with the teaching of the present invention, the optical system is folded as will be described more fully hereinafter and, in a typical embodiment, the arc length of a 60° field would be about equal to the focal length of 180 mm.

A rotating member supporting a plurality of lens assemblies is arranged with its center at the center of curvature of the field, and the lenses form a stationary image at the axis of rotation. Each lens assembly is aligned to form an image of a point on axis moving across the field at an angular rate dependent upon the speed of revolution of the rotating member. The stationary image containing radiant energy information dissected from the field is reimaged upon the detecting means and a signal, preferably electrical, is produced as a function of the instantaneous radiant energy information received by the detector. In a typical system, the radius at the lenses would be half the focal length or 90 mm. in accordance with the exemplary dimensions previously cited. A rotating member supporting six equally spaced lens assemblies provides that each lens subtends 60°, the field angle used in the example cited. Such a rotating member produces six scans per revolution and, in a typical infrared system, for instance, would be rotated at a readily realized and practical speed. Obviously, if the rotating member were made larger and an increased number of lens assemblies were mounted thereon, the acceleration at the periphery of the rotating member could be markedly reduced for the same scan rate.

In accordance with the teaching of the present invention, a broad field of view, such as 60° x 60°, is completely scanned by arranging that the incremental lineal area of scan which may be 60° x 1°, for example, be swept relative to the field of view. This is accomplished in one embodiment of the present invention by providing that the 60° x 1° field falling upon the primary mirror of the system is cyclically swept so as to include the entire field of view. If, on the other hand, a very small field of view is to be scanned, it is possible that an increased number of lens assemblies be arranged on the rotating member so that they are displaced along the periphery of the rotating member and each lens assembly has a slightly different plane of rotation. Such positioning of the lens assemblies therefore provides sweeping of the line scan through a small angular field of view.

FIG. 1 schematically illustrates the principal elements of the optical system of the present invention and shows a primary mirror 10, which is spherical in configuration, and a plane mirror 11 positioned so as to reflect a selected field of view to the primary mirror 10. The plane mirror 11 is positioned in proximity of the field image formed by the primary mirror 10 and is provided with a slot 12 which permits the field image of the primary mirror 10 to pass beyond the plane mirror 11. This slot arrangement causes some loss of the radiant energy received from the field of view, but the loss is such a relatively small amount of energy that it can be overcome by other advantages of the system, as will appear hereafter. Upon passing through the slot 12, the field image is scanned by a plurality of lenses mounted to rotate in a member 13, illustrated in FIG. 1, substantially as the rim of a wheel. The plurality of lenses 14 move in an arc across the curved field image focused at the proximity of the slot 12 in the plane mirror 11. The arcuate path of the lens has the same center of curvature as the primary mirror and the curved field image. Accordingly, lens 14 scan lineal areas of the field image. The term "lineal area" is used to describe the area within one of a plurality of scanned lines which provide substantially uniform coverage of an image in the manner of a television raster. The instantaneous radiation transmitted by each lens 14 as it scans the field image is focused upon a detector 15 positioned to receive radiation at the axis of rotation. The rotating member 13 is, of course, arranged to be driven at a speed which is commensurate with the response time of the particular detector used in the system so as to afford optimum definition of the radiant energy information introduced into the system. A window 18 may be used to isolate and protect the optical system as required by particular uses.

FIG. 2 shows a sectional view of the major components of the optical system of the present invention, and it is seen that the primary mirror 10 forms a curved image in the slot 12 of the plane mirror 11 which may be referred to in this particular embodiment as the scanning mirror. The curved image thus formed is scanned by six optical assemblies, each comprising two lenses 14 and 16 made of material which transmits the particular type of energy to be detected by the ystem. In a system which is used to detect a field of view presenting infrared information, the two lenses 14 and 16 may be made of arsenic trisulphide coated with silicone monoxide to reduce reflection. Such coating reduce energy losses and aid in achieving the utmost use of the radiant energy information introduced into the system by the primary mirror and the scanning mirror arrangement.

The first lens 14 of the lens assembly in the optical system focuses an image of the entrance pupil at a point indicated as the "pupil image," and an aperture stop *14a* of appropriate dimension may be placed at this point to fix the focal ratio of the system. The lens 14 also reimages the image formed by the primary mirror at the location of the second lens 16 of each lens assembly. At this location, a field stop *16a* may be introduced to fix the picture element size. The function of the lens 16 is to reimage the pupil image formed by the fixed lens 14 on a detector 15. Thus, the detector 15 is illuminated by a pupil image which is an important feature of the present invention because the pupil image is uniform in its distribution of illumination. The same is not true of field image detector illumination. The radiation beam formed by each lens assembly is intercepted by a small hexagonal prism 17 comprised of reflective polygonal facets positioned so that the focus of the radiation which it reflects occurs on the axis of rotation. Thus, each image formed upon the detector 15 is stationary although the lens assemblies providing such images are rotated as has been previously described. The hexagonal prism 17 rotates with the lens assembly and is, of course, mounted in fixed relation to the rotating member. The scanning mirror 11 is arranged so that its angular disposition may be varied about an axis which is substantially tangent with the arc defined by the rotation of lens 14. The mirror 11 may thus be angularly swept to the position shown as 11*a*. The radiant energy information which is reflected by the plane mirror 11 to the primary mirror 10 may be thus varied and easily scanned through a line of sight 60°, for instance.

FIG. 3 is a top elevational view of the embodiment shown in FIG. 2 and like elements of the system bear the same numerical designations as in FIG. 3.

In FIG. 3 it may clearly be seen that the primary mirror 10 is of sufficient extent to embrace a 60° scan along its major dimension. The scanning mirror 11 is proportionately dimensioned to provide the 60° wide strip image from a selected field of view as shown. It should be noted that the slot 12 shown in FIG. 3 extends through the full width of the plane mirror 11, and it may be desirable to provide the system with such a two-piece plane mirror in order to facilitiate production of that optical element. However, the principles of operation of the present invention are not changed by this particular arrangement, the two-piece plane mirror 11 being commonly supported as a unitary member by appropriate frame means 19 and its angular disposition being varied as an integral unit. The lens assembly system by which a stationary image of the lineally scanned radiation energy information is transmitted to a detection means is illustrated in FIG. 3 as being comprised of six lens assemblies each of which includes two lenses 14 and 16, and a hexagonal reflective prism having a plurality of polygonal facets each of which is optically aligned with an associated lens assembly. The axis of rotation is seen to be at the center of curvature of the primary mirror 10, and the scanning mirror 11 is seen to be located at approximately the focal sphere of the primary mirror 10, or substantially midway between the axis of rotation and surface of the primary mirror in the spherical system illustrated.

The schematic illustration of FIG. 4 shows a variant embodiment of the present invention which may be utilized to scan a full field of view within relatively small angular confines. In the system illustrated by FIG. 4, the plane mirror 20, which is located at approximately the field image formed by the primary mirror 21, need not be angularly varied and accordingly may remain completely fixed in relation to the primary mirror of the system. The plane mirror 20 is accordingly positioned to receive the desired field of view containing radiant energy information and reflects such radiant energy information to a primary mirror 21. The plane mirror 20, being positioned at approximately the field image sphere of the primary mirror 21, has a slot 22 therein to permit the field image radiation to pass through. A rotating member 23 supports a plurality of lens means 24 which are arranged to be rotated past the slot 22 of the plane mirror 20 in the proximity of the arcuate focal points of the primary mirror 21 so as to transmit the received radiant energy information to a stationary image which impinges upon detector 25 located on the axis of rotation, in a manner quite similar to that described previously in connection with the embodiments of FIGS. 1, 2 and 3.

It will be noted, however, that in the embodiment illustrated in FIG. 4 there are a greater number of lenses 24 mounted on the rotating member 23 than in the embodiment of FIGS. 1, 2, and 3, and each lens is displaced so that it traverses a slightly different plane of rotation from adjacent lenses. This is best illustrated in FIG. 4*a* showing a section of the rotating member 23 and adjacent lenses 14′ and 14″. The angle $\theta$ between lenses represents the span of lineal scan of each lens, while the angle $\alpha$ represents the spacing between contiguous lineal areas of scan.

FIG. 5 schematically illustrates a radiation detection system embodying the present invention which is arranged to display a visual representation of the radiant energy information contained in a selected field of view. The primary mirror 30 and scanning plane mirror 31 are disposed in substantially the same relation as comparable elements shown in the embodiments of FIGS. 1, 2 and 3. The rotatable member takes the form of a lens wheel 32 supporting a plurality of lenses 33 and driven by a motor 34. The drive motor 34 is operatively connected to a synchronizing signal generator 35 which generates a signal in synchronism with the lineal scan of each lens 33 as it traverses its arcuate path intercepting the field-image formed near the slot 36 of the plane mirror 31. Alternative means for producing a synchronizing signal may be employed, such as providing that the lens wheel is arranged to interrupt light transmission in synchronism with the lineal scan of each lens 33 to produce an optical signal. In any case, the synchronizing signal is preferably transduced to electrical form to trigger a horizontal sweep generator 37.

The drive motor 34 may be adapted to perform the additional function of varying the angular disposition of the scanning mirror 31 and thereby sweep the lineal scan of the lens wheel across the entire field of view. The mechanical linkage between the drive motor 34 and the scanning mirror includes appropriate gear reduction means (not shown) in accordance with the designed relationship of the number of lineal scans to each field sweep. The scanning mirror actuates vertical synchronizing signal generating means 38 which in turn triggers a vertical sweep generator 39.

The instantaneous radiation signal impinging upon a suitable detector 40 produces a video signal which is amplified in a video amplifier 41 to provide the intelligence contained in a visual display on a cathode ray tube 42.

The horizontal sweep signal provided by the horizontal sweep generator 37, and the vertical sweep signal provided by the vertical generator 39 which are synchronously related to each lineal scan and each field sweep of the optical system, respectively, are fed to cathode ray deflection means such as the yoke 43 to form a luminescent raster which constitutes a visual frame of reference correlated to the radiant field of view detected by the system.

It will be evident to those skilled in the art that the present invention offers a compact system which is ideally suited to receive and dissect radiant energy information with minimum signal loss. The system affords rapid and accurate optical scanning which is commensurate with the minimum response time of the most sensitive infrared detectors, for instance.

The lineal scanning components of the system are considerably more efficient than those of many other scanning systems due to the fact that no fly-back time is required. Accordingly, in the operation of the present invention there is no lost time due to wasted movement of the lineal scanning components and each succeeding lineal scan begins at the instant that its preceding lineal scan has been completed. This feature of the invention makes it possible to scan a considerably greater area than can be scanned by a system which requires fly-back time. Such fly-back commonly reduces the available scanning time by 15 percent or more.

Other advantages of the present invention include the unique optical arrangement by reason of which the focal ratio of the system may be readily and accurately determined by placing an aperture stop at the "pupil image" of the system. Additionally, the novel optical arrangement affords the advantage of determining the picture element size by introducing a field stop at an appropriate and convenient position within the system.

The present invention also includes the feature by which the radiation responsive detector is illuminated by a pupil image rather than a field image. The pupil image is uniform in its illumination, thus obviating signal errors due to nonuniform illumination falling on "hot spots" of the radiation-transducing element of the detector.

These and other features render the present invention ideally suited to passive radiation detection systems, particularly where a continuously changing field of view is to be scanned. The unique optical arrangement of the present invention lends itself to compact packaging, and its moving components present no extraordinary problems of excessive speed, vibration, or wear.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. An optical system for scanning a radiant field of view comprising a spherical primary mirror, a plane mirror positioned at substantially the field image formed by said primary mirror for reflecting radiataion from a selected field of view to said primary mirror and having a slot therein to permit passage of the field image of said radiation therethrough, means for scanning a lineal area of the radiation transmitted through said slot including a lens assembly having a fixed aperture rotated within the field image sphere of the primary mirror for transmitting the pupil image radiation to its axis of rotation, and means for sweeping the lineal area relative to said field of view.

2. An optical system for scanning a radiant field of view comprising a spherical primary mirror, a plane mirror positioned at substantially the field image formed by said primary mirror for reflecting radiation from a selected field of view to said primary mirror and having a slot therein to permit passage of the field image of said radiation therethrough, means for scanning a lineal area of the radiation transmitted through said slot including a lens assembly having a fixed aperture rotated within the field image sphere of the primary mirror for transmitting the pupil image radiation to its axis of rotation, and means for varying the angular disposition of said plane mirror whereby to sweep said lineal area relative to said field of view.

3. An optical system for scanning a radiant field of view comprising a spherical primary mirror, a plane mirror positioned at substantially the field image formed by said primary mirror for reflecting radiation from a selected field of view to said primary mirror and having a slot therein to permit passage of the field image of said radiation therethrough, means for scanning the radiation transmitted through said slot including a plurality of lens assemblies mounted on a rotating member within the field image sphere of the primary mirror for transmitting the pupil image radiation to the axis of rotation, each said lens assembly being displaced from those adjacent to it, whereby to successively scan contiguous lineal areas of said field of view.

4. An optical system for scanning a radiant field of view comprising a spherical primary mirror, a plane mirror positioned at substantially the field image formed by said primary mirror for reflecting radiation from a selected field of view to said primary mirror and having a slot therein to permit passage of the field image of said radiation therethrough, means for scanning lineal areas of the radiation transmitted through said slot including a plurality of lens assemblies uniformly spaced about a rotating member within the field image sphere of the primary mirror for transmitting the pupil image radiation to the axis of rotation, and means operating in synchronism with said rotating member for angularly varying the disposition of said plane mirror whereby to repetitively sweep said lineal scan through said field of view.

5. An optical system for scanning a radiant field of view comprising a spherical primary mirror, a plane mirror positioned at substantially the field image formed by said primary mirror for reflecting radiation from a selected field of view to said primary mirror and having a slot therein to permit passage of the field image of said radiation therethrough, means for scanning lineal areas of the radiation transmitted through said slot including a plurality of lens assemblies mounted on a rotating member for transmitting pupil image radiation toward the center of rotation, reflective means positioned to deflect said radiation to a point on the axis of rotation outside the plane of rotation, and means for sweeping the lineal area relative to said field of view.

6. An optical system for scanning a radiant field of view comprising a spherical primary mirror, a plane mirror positioned at substantially the field image formed by said primary mirror for reflecting radiation from a selected field of view to said primary mirror and having a slot therein to permit passage of the field image of said radiation therethrough, a plurality of lens assemblies mounted on a rotating member for transmitting pupil image radiation toward the center of rotation, each said lens assembly including a first transfer lens positioned near the focal point of the primary image, and a second transfer lens aligned with said first transfer lens and positioned at the image of the primary image formed by said first lens, and means for sweeping the lineal area relative to said field of view.

7. An optical system for scanning a radiant field of view comprising a spherical primary mirror, a plane mirror positioned at substantially the field image formed by said primary mirror for reflecting radiation from a selected field of view to said primary mirror and having a slot therein to permit passage of the field image of said radiation therethrough, a plurality of lens assemblies mounted on a rotating member for transmitting pupil image radiation toward the center of rotation, each said lens assembly including a fixed aperture stop and a first transfer lens positioned near the focal point of the primary image, and a fixed field stop and a second transfer lens positioned at the image of the primary image formed by said first lens.

8. A system for transducing the information contained in a radiant field of view by sequential line scanning which comprises a primary mirror, a plane mirror positioned at substantially the field image formed by said primary mirror for reflecting radiation from a selected field of view to said primary mirror and having a slot therein to permit passage of the field image of said radiation therethrough, means for scanning a lineal area of the radiation transmitted through said slot including a lens assembly rotated within the field image sphere of the primary mirror for transmitting the pupil image radiation to its axis of rotation, means on the axis of rotation for producing a signal commensurate with the instantaneous radiation impinging thereon, and means for sweeping said lineal area relative to said field of view.

9. A system for transducing the information contained in a radiant field of view by sequential line scanning which comprises a primary mirror, a plane mirror positioned at substantially the field image formed by said primary mirror for reflecting radiation from a selected field of view to said primary mirror and having a slot therein to permit passage of said radiation therethrough, means for scanning lineal areas of the radiation transmitted through said slot including a plurality of lens assemblies rotated within the field image sphere of the primary mirror for transmitting the pupil image radiation to its axis of rotation, reflecting means positioned at the center of rotation of said lens assemblies and having a reflective element aligned with each said assembly for directing radiation to a common point on the axis of rotation, radiation sensitive means positioned at said common point for producing a signal commensurate with the radiation impinging thereon, and means for sweeping said lineal area relative to said field of view.

10. A system for transducing the information contained in a radiant field of view by sequential line scanning which comprises a primary mirror, a plane mirror positioned at substantially the field image formed by said primary mirror for reflecting radiation from a selected field of view to said primary mirror and having a slot therein to permit passage of said radiation therethrough, means for scanning lineal areas of the radiation transmitted through said slot including a plurality of lens assemblies mounted on a rotating member for transmitting pupil image radiation toward the center of rotation, each said lens assembly including a first transfer lens positioned near the focal point of the primary image and having a fixed aperture stop positioned to determine the desired focal ratio of the system, and a second transfer lens positioned at the image of the primary image formed by said first lens and having a fixed field stop positioned to determine the desired size of incremental radiant information transmitted by the system, and means for sweeping said lineal area relative to said field of view.

11. A system for transducing the information contained in a radiant field of view by sequential line scanning which comprises a primary mirror, a plane mirror positioned at substantially the field image formed by said primary mirror for reflecting radiation from a selected field of view to said primary mirror and having a slot therein to permit passage of the field image of said radiation therethrough, means for scanning lineal areas of the radiation transmitted through said slot including a plurality of lens assemblies rotated within the field image sphere for transmitting the pupil image radiation to the axis of said rotation, means on the axis of rotation for producing a signal commensurate with the instantaneous radiation impinging thereon, means for sweeping said lineal area relative to said field of view, and means for displaying said signal within a frame of reference in correlation with the radiation information within said field of view.

No references cited.

JEWELL H. PEDERSEN, *Primary Examiner.*

CHESTER L. JUSTUS, SAMUEL BOYD, BENJAMIN A. BORCHELT, *Examiners.*

F. C. MATTERN, Jr., D. D. DOTY, E. S. BAUER, *Assistant Examiners.*